May 12, 1964      P. M. HORVATH      3,132,542
CUTTER HAVING A REMOVABLE TIP
Filed March 27, 1962
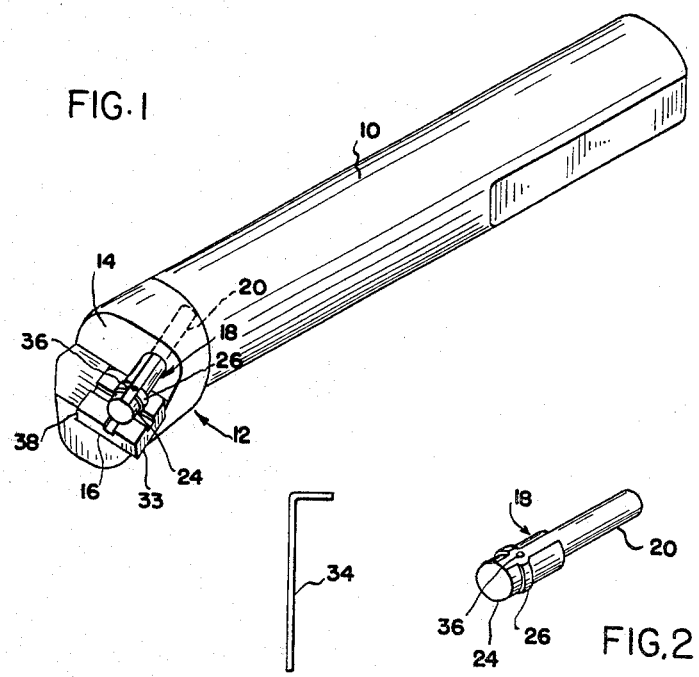
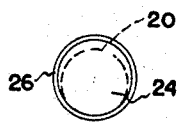
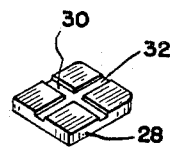
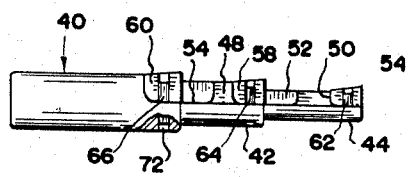
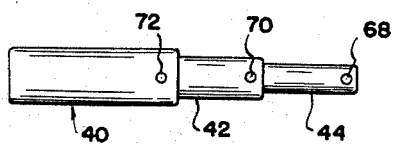
*INVENTOR.*
PAUL M. HORVATH
BY
ATTORNEY

United States Patent Office 3,132,542
Patented May 12, 1964

3,132,542
CUTTER HAVING A REMOVABLE TIP
Paul M. Horvath, 8736 Orangelawn, Detroit 4, Mich.
Filed Mar. 27, 1962, Ser. No. 182,906
2 Claims. (Cl. 77—58)

This invention relates to cutting tools having removable tips and more particularly to a cam arrangement for removably supporting a tip on a cutting tool.

Cutting tools presently in use are often provided with parallel sided slots adapted to receive cutting tips formed of a harder material than the tool itself, such as a metal carbide or a ceramic-metallic composition. A cutting tip is placed in the slot and secured in this position by a cam which extends into and is supported by one of the two parallel sides of the slot. When the cam is rotated, it bears against the cutting tip forcing it against the opposite parallel side, thus locking it into position.

Since this slotted configuration is difficult to construct and even more difficult to alter, a standard tool with a standard slot is ordinarily employed. Variations in the geometry required of the tool are achieved by cutting and machining the tip to a suitable configuration.

The present invention contemplates a cutting tool which obviates the difficulty inherent in a slotted arrangement by utilizing a tool having only two planar surfaces disposed at right angles to one another, thus permitting the tool to be shaped easily by milling or shaping operations.

In a preferred embodiment of the present invention, which will be subsequently described in detail, a cam is employed which has a cylindrical shank portion rotatably mounted in one of the two perpendicular planar surfaces of the tool. A second cylindrical portion has its axis off-set from but parallel to the axis of the cylindrical shank portion and has a flange formed around its midsection.

The cutting tip, having two perpendicular linear grooves along one planar surface, is held in position between the cam and the second planar surface. A projection extending perpendicularly from the second planar surface serves to prevent movement of the tip in the direction away from the workpiece being cut. The rotation of the cam is in such a direction as to force the tip against this second planar surface. The flange of the cam fits into one of the grooves in the tip, thus preventing movement of the tip in the direction away from the first planar surface. The cutting tip is preferably symmetrical about one of the linear grooves so that it may be rotated through 90 degrees to present a second cutting surface when the first one chills.

Since only two planar surfaces are required with the present invention, the tools can be easily formed on a milling or shaping machine. The size of the tips may be standardized while variations in the geometry of the tool may be accomplished by using different tools, each having a different configuration of planar surfaces.

The present invention is particularly adapted to use on boring bars and a second embodiment described hereinafter discloses a three-step bar in which three separate cutters are retained by individual cams supported at spaced points on a common surface. The cams each press one of the cutters against a wall which extends perpendicularly to that common surface. Such a bar would be exceedingly difficult to form using the technique of the prior art wherein it would be necessary to form three separate contiguous slots.

Other objects and advantages of the present invention will become more obvious from the following detailed description wherein is set forth a preferred embodiment of the present invention. The description refers to the accompanying drawings in which:

FIGURE 1 is a perspective view of a preferred embodiment of the present invention.
FIGURE 2 is a perspective view of a cam which forms part of the embodiment of FIGURE 1;
FIGURE 3 represents a key useful with the preferred embodiment;
FIGURE 4 is an end view of the cam of FIGURE 2;
FIGURE 5 is a perspective view of the cutting tip used with the embodiment of FIGURE 1;
FIGURE 6 is a top perspective view of an alternative embodiment of the invention which takes the form of a three-step boring bar; and
FIGURE 7 is a bottom perspective view of the boring bar of FIGURE 6.

Referring to the drawings in detail, the invention is illustrated as comprising a shaft 10, having a head portion 12. The head portion 12 is composed of a first planar surface 14 disposed perpendicular to the axis of the shaft and head, and a second planar surface 16 perpendicular to the first planar surface 14.

A cam member 18 having a circular portion 20 rotatable in a hole 22 extending into the first planar surface 14 parallel to the axis of the shaft 10 is disposed above and parallel to the second planar surface 16. The cam member 18 also includes a cam portion 24 having an axis parallel to but displaced from the axis of the circular portion 20. A flange 26 extends about the midsection of the cam portion 24.

A cutting tip 28 of a suitable hard material such as metal carbides is shaped with grooves 30 and 32 extending across its upper face. The tip is placed between the cam member 18 and the second planar surface 16 so that a cutting edge 33 extends outward from the tool to make contact with the workpiece. The cam member 18 is rotated by inserting a key 34 into a hole 36 on the outer surface of the cam member and rotating it about the axis of the cam member. This locks the cam member 18 against the tip 28 and also locks the flange 26 in the groove 30 of the tip 28.

The cam member is arranged so that motion of the tip 28 away from the workpiece locks the tip even tighter between the cam portion 24 and the second planar surface 16.

A projection or projecting surface 38 perpendicular to the second planar surface 16 serves as a stop to prevent the cutting tip 28 from being forced in the direction away from the workpiece. The first planar surface 14, in like manner, aids in preventing movement of the tip in the direction of that surface.

The grooves 30 and 32 of the flange 26, while not necessary to the present invention, provide additional locking support against movement of the tip 28, particularly against forces tending to pull the tip out of the head 12.

When the cutting edge of the tip 28 has been worn down, the cam member 18 may be unlocked, the tip removed and replaced with a different edge in cutting position. In this manner, all four cutting edges of the tip may be utilized.

FIGURES 6 and 7 disclose a three-step boring bar 40 which makes use of the concept of the present invention. The bar 40 is generally cylindrical in shape and has in addition to its shank section 41 two co-axially extending sections of reduced diameter 42 and 44. One radial quadrant of the reduced sections 42 and 44 are cut away so as to produce a pair of axially extending surfaces 46 and 48 which are at right angles to one another. The cut away extends into the edge of the shank section 41.

Three depressions 50, 52 and 54 are milled in the surface of the wall 48. The depressions 52 and 54 are so positioned that their rear edges are disposed adjacent the steps between the sections 42 and 44, and 41 and 44, respectively. The depression 50 is disposed on the extreme outer edge of the section 44.

Three removable cutting tips 62, 64 and 66 are respectively positioned in the depressions, or slots, 50, 52 and 54 with their curved rear edges in contact with the rear edges of the slots.

The tips 56, 58 and 60 are retained against the walls of their respective depressions 50, 52 and 54 by three cams 62, 64 and 66. The cams are of the same general nature as the cam 18 which is used in connection with the embodiment of FIGURE 1. Their primary difference resides in the absence of a flange 26. Rather, the upper surfaces of the cams have a roughened or knurled finish which frictionally engages them with the contiguous surface of the cutting tips.

The shanks of the cams 62, 64 and 66 are retained in three center holes formed perpendicularly to the surface 46 and extending through that surface to the outer side of the cutter. Shanks of the cams are offset with respect to their upper sections in the same manner as the cam 18. Each of the cams 62, 64 and 66 has a key slot formed axially in its lower edge (not shown) which allows the cam to be revolved by a key inserted in the lower ends of one of the holes 68, 70 and 72.

Having described the invention in its simplest terms, it is to be understood that the features of construction may be changed and varied in greater or lesser degree without departing from the essence of the invention defined in the appended claims.

I claim:
1. A cutting tool, comprising:
a shank;
a head mounted at one end of said shank;
a first planar surface formed on said head;
a second planar surface formed on said head perpendicular to said first planar surface;
a hole extending perpendicularly into said first planar surface;
a cam member having a cylindrical portion rotatable within said hole, a cam portion extending parallel to said second planar surface, and a flange encircling said cam portion;
a projection extending perpendicularly from the surface of said second planar surface;
a cutting tip having a groove along one surface between said cam portion and said second planar surface whereby said flange fits into said groove;
and means for rotating said cam member.

2. A cutting tool, comprising:
a shank;
a head mounted at one end of said shank;
a first planar surface formed on said head;
a second planar surface formed on said head perpendicular to said first planar surface;
a hole extending perpendicularly into said first planar surface;
a cam member having a cylindrical portion rotatable within said hole, a cam portion extending parallel to said second planar surface, and a flange encircling said cam portion;
a projection extending perpendicularly from the surface of said second planar surface;
a cutting tip having perpendicularly intersecting grooves along one surface between said cam portion and said second planar surface whereby said flange fits into one of said grooves;
and means for rotating said cam member.

References Cited in the file of this patent
UNITED STATES PATENTS

| | | |
|---|---|---|
| 1,458,802 | Bufford | June 12, 1923 |
| 2,343,855 | Luers | Mar. 7, 1944 |
| 3,060,771 | Johnson | Oct. 30, 1962 |

FOREIGN PATENTS

| | | |
|---|---|---|
| 1,241,654 | France | Apr. 8, 1960 |
| 2,250,849 | France | Dec. 5, 1960 |